US011165713B1

(12) United States Patent
Sanghai et al.

(10) Patent No.: US 11,165,713 B1
(45) Date of Patent: Nov. 2, 2021

(54) SHARING RESOURCES BETWEEN CLIENT DEVICES IN A VIRTUAL WORKSPACE ENVIRONMENT

(71) Applicant: Citrix Systems, Inc., Fort Lauderdale, FL (US)

(72) Inventors: Devyash Sanghai, Pompano Beach, FL (US); Rishabh Jain, Pompano Beach, FL (US); Georgy Momchilov, Parkland, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/942,037

(22) Filed: Jul. 29, 2020

(51) Int. Cl.
| | |
|---|---|
| *G06F 15/173* | (2006.01) |
| *H04L 12/911* | (2013.01) |
| *H04L 12/927* | (2013.01) |
| *H04L 29/08* | (2006.01) |

(52) U.S. Cl.
CPC ............ *H04L 47/781* (2013.01); *H04L 47/80* (2013.01); *H04L 47/822* (2013.01); *H04L 67/104* (2013.01); *H04L 67/26* (2013.01)

(58) Field of Classification Search
CPC ..... H04L 47/781; H04L 47/80; H04L 47/822; H04L 67/104; H04L 67/26
See application file for complete search history.

(56) References Cited

U.S. PATENT DOCUMENTS

| | | | |
|---|---|---|---|
| 8,988,713 B2 | 3/2015 | Gutnik et al. | |
| 2012/0176639 A1* | 7/2012 | Tsai | G06F 3/1226 358/1.14 |
| 2017/0257215 A1* | 9/2017 | Huang | H04L 67/1097 |

* cited by examiner

*Primary Examiner* — Wing F Chan
*Assistant Examiner* — Joseph R Maniwang
(74) *Attorney, Agent, or Firm* — Hoffman Warnick LLC (57) ABSTRACT

A system and method for sharing resources between client devices in a virtual computing environment. A method is disclosed that includes receiving a request from a first client device for a list of available resources that are locally connected to other client devices and that are unavailable to the first client device via an enterprise service within the virtual computing environment; providing the list of available resources to the first client device; receiving a selection of a resource included within the list of available resources from the first client device; providing a push notification to a second client device connected to the selected resource to establish a connection with the selected resource; and providing, to the first client device, access to the selected resource via the established connection.

20 Claims, 10 Drawing Sheets

SHARING RESOURCES BETWEEN CLIENT DEVICES IN A VIRTUAL WORKSPACE ENVIRONMENT

BACKGROUND OF THE DISCLOSURE

Enterprise computing platforms, which are typically deployed via cloud systems, virtual networks, servers, etc., allow users to utilize and share services and features over a network from client devices. For example, in a virtual workspace environment, users can interact with virtual workspaces that appear on their client devices but are actually running elsewhere on a server.

BRIEF DESCRIPTION OF THE DISCLOSURE

Aspects of this disclosure provide a system and method for sharing locally connected resources between client devices in a virtual computing environment.

A first aspect of the disclosure provides a method implemented with a computing device for sharing resources in a virtual computing environment. The method includes receiving, by a computing system, a request from a first client device, the request being for a list of available resources, wherein the list of available resources include resources that are locally connected to at least one other client device and that are unavailable to the first client device via an enterprise service within the virtual computing environment. The method further includes providing, by the computing system, the list of available resources to the first client device, the list of available resources including an identifier (ID) and metadata for at least one of the available resources. Furthermore, the method includes receiving, by the computing system, a selection of a resource included within the list of available resources from the first client device; and providing, by the computing system, a push notification to a second client device connected to the selected resource to establish a connection with the selected resource.

A second aspect of the disclosure provides a computing device that provides for the sharing of resources within a virtual computing environment. The device includes a memory and a processor coupled to the memory that are configured to implement a process. The process includes storing information associated with a set of resources, the information including an identifier (ID) and metadata for each resource in the set of resources, wherein each resource is connected locally to a client device and each resource is unavailable to other client devices via an enterprise service within the virtual computing environment. The process further includes receiving from a first client device a request for a list of available resources, providing the list of available resources to the first client device, the list of available resources including the ID and metadata for each of the available resources, and receiving from the first client device a selected resource from the list of available resources, wherein the selected resource is connected to a second client device. The process further includes pushing a notification to the second client device to establish a connection with the selected resource.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for sharing local resources connected to client devices with other client devices in a virtual computing environment without utilizing resource servers. In the past, sharing of a resource such as a printer amongst client devices required that the printer be managed by an enterprise service such as a universal print server (UPS), complex desktop delivery controller (DDC) and/or other policies. Accordingly, it was not possible to share a resource such as a printer, fax, etc., that was locally (e.g., directly) connected to a client device, unless the resource was managed by an enterprise service. The resource could only be accessed via the client device to which it is connected or locally from a virtual desktop agent (VDA) session connected to the client device.

The present embodiments provide methodologies for registering resources that are locally-connected to a set of client devices with a workspace (WS) resource server, e.g., located in a cloud. The WS resource server is also configured to receive requests from users of client devices for a list of currently available resources. Thereafter, a connection can be established between a locally connected resource on a first client with a second client. Each client includes a client side (CS) service that can manage the interface with the WS resource service, e.g., via a virtual desktop agent (VDA) session, WebSocket connection, etc.).

For the purposes of this disclosure, a "local resource" generally includes any resource that is readily accessible by or from a client device, including network-based resources, but cannot be accessed without traditional enterprise services such as authenticators, gateways, workspace applications, legacy Universal Print Servers, etc. Local resources may be connected to a client device using connections such as USB, Bluetooth, Wifi, etc.

Figure 1:
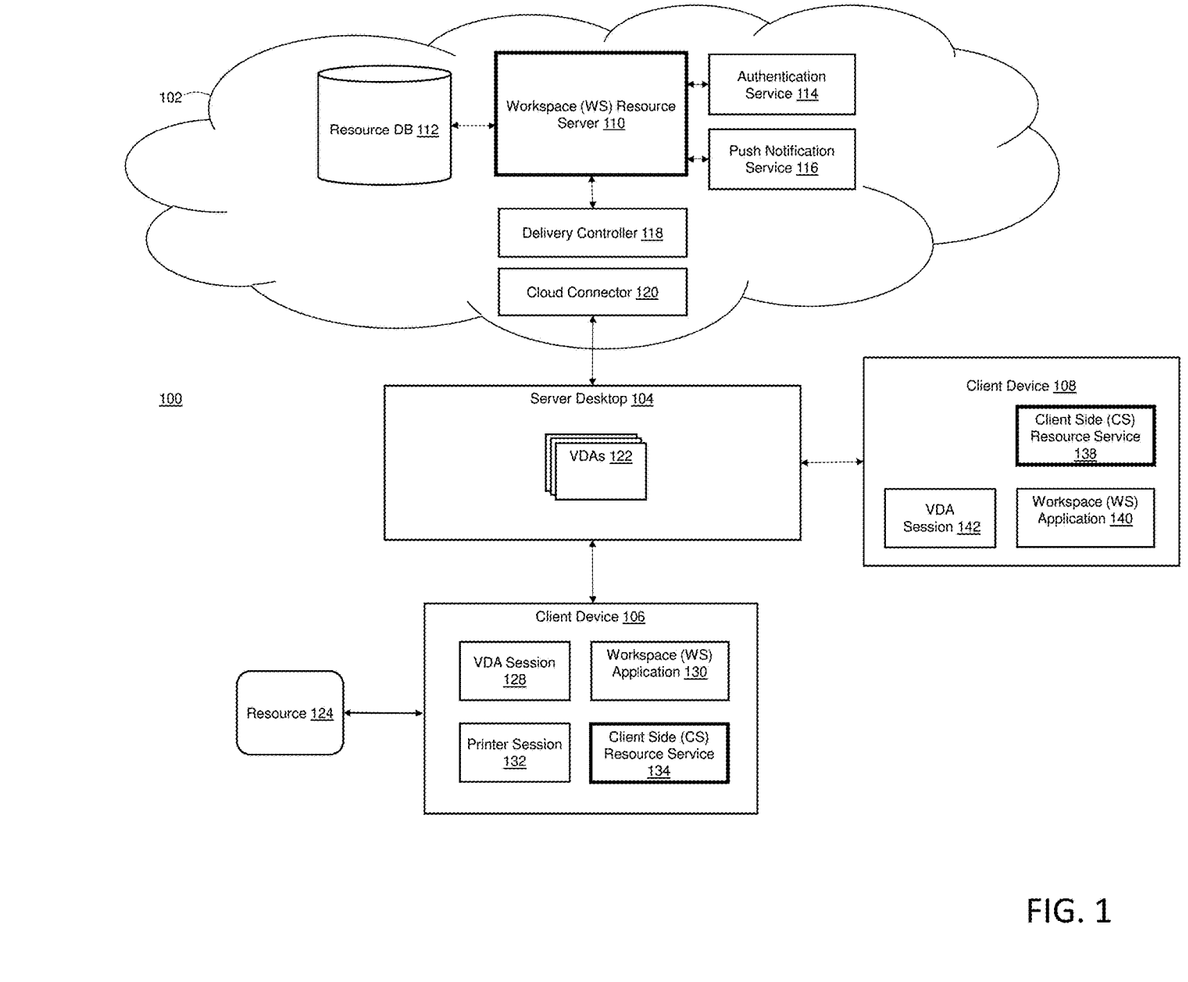
FIG. 1 depicts a virtual computing environment in accordance with an illustrative embodiment.

FIG. 1 depicts a computing infrastructure 100 having a virtual computing environment in accordance with an illustrative embodiment. In this case, a server desktop 104 running, e.g., MS Windows®, Linux®, etc., includes a set of virtual desktop agents (VDAs) 122, that provide remote virtual access to the server desktop 104 for a set of client devices (e.g., laptops, smart devices, etc.). Server desktop 104 may for example be implemented as an on-premises system or via a cloud 102. In the example shown, server desktop 104 is implemented as an on-premises system and interacts with cloud 102 via a cloud connector 120 and delivery controller 118, which provides access to a workspace (WS) resource server 110.

In the example shown, two client devices 106, 108 are configured to remotely access the server desktop 104. The first client device 106 includes a workspace (WS) application 130 (e.g., as provided by Citrix® Workspace commercially available from Citrix Systems of Fort Lauderdale, Fla. in the United States) running a client side (CS) resource service 134, and is connected to the server desktop 104 via a VDA session 128. Similarly, the second client device 108 includes a WS application 140 running a CS resource service 138, and is connected to the server desktop 104 via a VDA session 142.

In this case, a resource 124 such as a printer, scanner, fax, peripheral, etc., has been connected to client device 106 without using an enterprise service, e.g., via a universal serial bus (USB) connection. In past implementations, resource 124 would only be available via the local client device 106, i.e., a user of remote client device 108 could not access the resource 124 without an enterprise service such as a print server. The present approach allows the second client device 108 to access the resource 124 on the first client device 106 with the use of: (1) the client side (CS) resource service 134, 138 installed on client devices 106, 108, respectively; and (2) the WS resource server 110 implemented in cloud 102. In some embodiments, the client side (CS) resource service 134, 138 may be installed as part of the Workspace (WS) application 130, 140 respectively.

In one illustrative embodiment, the WS resource server 110 communicates with CS resource services 134, 138 over a virtual channel infrastructure, such as Citrix HDX (High Definition Experience) protocol, either in a full or lightweight headless session. A headless session utilizes a protocol such as Citrix Independent Computing Architecture (ICA) that is established automatically and silently as a background operation without direct user initiation and without user visible artifacts. Such an infrastructure renders a virtual version of a workspace on a client device and can for example: (1) examine screen activity, application commands, endpoint device, and network and server capabilities to instantly determine how and where to render an application or desktop activity; (2) provide data compression; and (3) optimize network traffic using techniques such as data deduplication. In a lightweight headless session, the session is for example run without rendering a graphical user interface or any additional virtual channels such as audio, multimedia, client drive mapping, clipboard mapping, etc., which are not required for resource 124 utilization.

The CS resource services 134, 138 communicate with the WS resource server 110 using the associated WS application 130, 140 via an active session, e.g., using an HDX VDA session, a headless VDA session, or some other protocol. Illustrative functions performed by CS resource services 134, 138 include capturing resource connect and disconnect events, e.g., "plug and play" events, generated by the resource 124 and forwarding device metadata to the WS resource server 110 to effectuate registration of the resource 124 in the cloud 102. The CS resource service 134, 138 also allows the user to set access rights to grant access to the resource 124 to other users or devices. These rights are then forwarded to either the WS resource server 110 or to another server managing the access control. The CS resource services 134, 138 can also send enumeration requests to the WS resource server 110 to list all the resources available to a user and the associated resource details. The CS resource services 134, 138 can additionally listen for any incoming requests to access a locally connected resource 124 from a remote client device and grant access to the requestor after authenticating and checking the access rights of the requestor from the WS resource server 110.

In one illustrative embodiment, when a new resource 124 is connected to a client device 106, the WS resource server 110 registers the new client side resource 124, e.g., in a resource database (DB) 112. In one embodiment, when a new resource 124 is connected, the WS resource server 110 receives the resource metadata and generates a resource ID. The WS resource server 110 maintains a list of resource IDs in the resource DB 112, which includes associated resource metadata.

In response to a user request, WS resource server 110 will generate a list all the client side resources 124 available to the user after verifying the access rights for that user. The WS resource server 110 may for example contact an authorization service 114, which may or may not be part of the WS resource server 110, to authenticate the user and authorize the user based on an authorization policy, e.g., using a directory service such as Active Directory by Microsoft. Once generated, WS resource server 110 will share the resource metadata to a requesting CS resource service 138. Metadata may for example include: resource type, name, model, driver version; {Class GUID, Instance GUID} on Windows; {Product ID, Product Version} on LINUX; device Mac address; client name; etc. In some example embodiments, a user request could be triggered within a VDA session, for example, VDA session 142. In other example embodiments, a user request could be triggered from a client device, for example, at WS application 140 of client device 108, then relayed to the WS resource server 110 via the VDA session 142.

Figure 2:
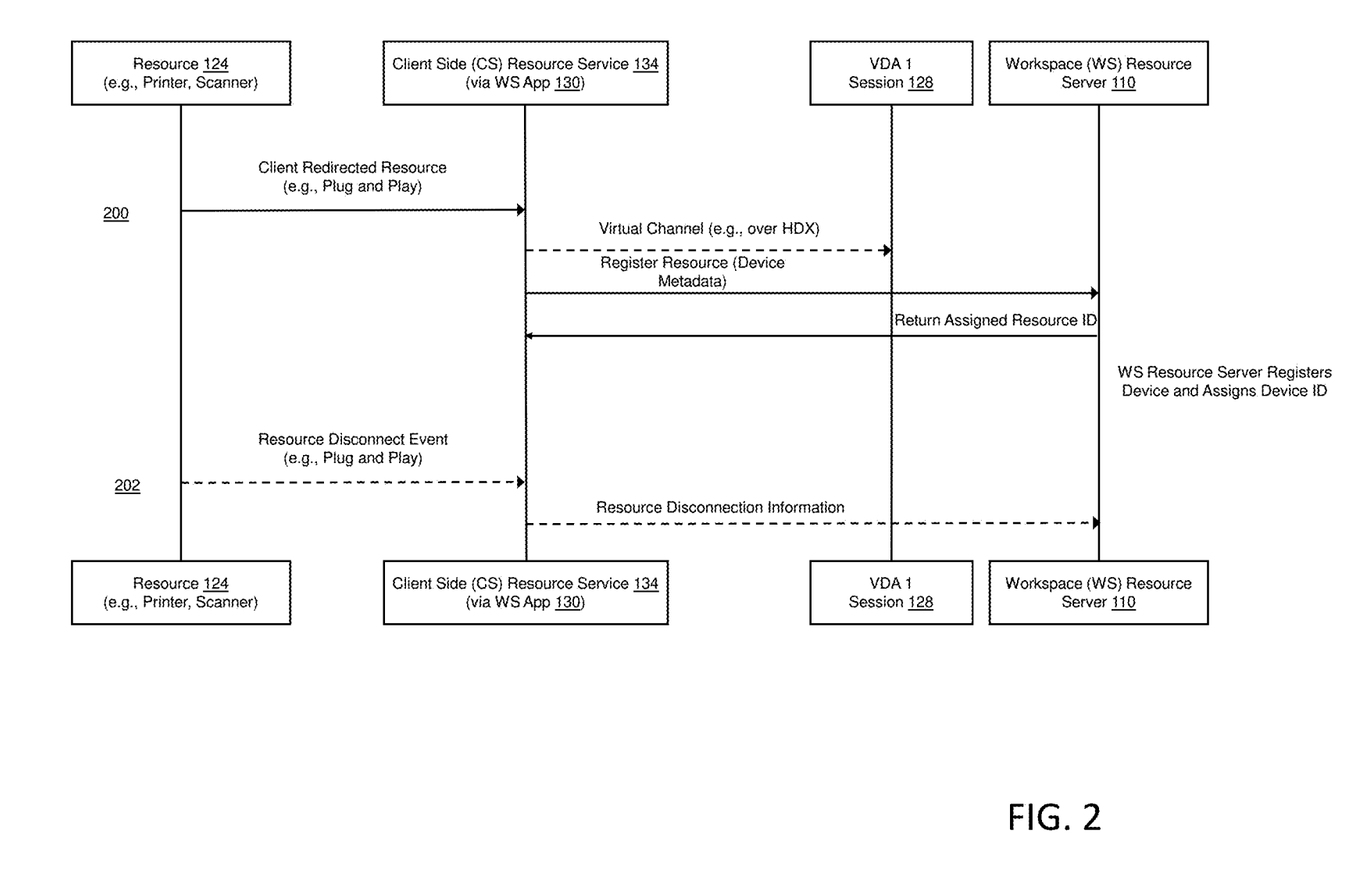
FIG. 2 depicts a diagram for registering and unregistering resource within the virtual computing environment in accordance with an illustrative embodiment.

FIG. 2 depicts a flow diagram showing an illustrative resource registration process 200 and an illustrative resource disconnect process 202, with reference to FIG. 1. During a resource registration process 200, the user connects a resource 124 to a client device 106, which causes the resource 124 to generate an event, such as a "plug and play" event, which is then handled by the CS resource service 134 running on the WS application 130. The event is then communicated via a virtual channel, e.g., over HDX using an active full or headless HDX VDA session 128. Next, the WS application 130 makes a registration call to the WS resource server 110 via the cloud connector 120. The WS application 130 also sends the resource metadata along with the request.

In an illustrative embodiment, during a registration process when a device is detected, the CS resource service 134 sends resource metadata (i.e., device information) to the WS resource server 110 that may for example include interface call GUID, handle, type, name, model, product ID, product version, driver information, IP address, etc. The WS resource server 110 then sends a resource ID back to the CS resource service 134, which is used for subsequent events.

Accordingly, in response to a received request, the WS resource server 110 verifies the resource metadata (e.g., checks for duplicates, etc.), which may include evaluating the resource type, resource drivers, resource IP address (internal/external), etc. Next, the WS resource server 110 generates the resource ID, assigns the resource ID to the resource metadata and sends the resource ID to the WS application 130 and the CS resource service 134, which keeps track of the resource 124.

During a resource disconnect process 202, e.g., the resource 124 is unplugged from the client device 106, and, e.g., a "plug and play" disconnect event is generated. The CS resource service 134 running on the WS application 130 captures the event and forwards a request to the WS resource server 110 along with the resource ID to mark the resource as inactive in the resource database 112.

Figure 3:
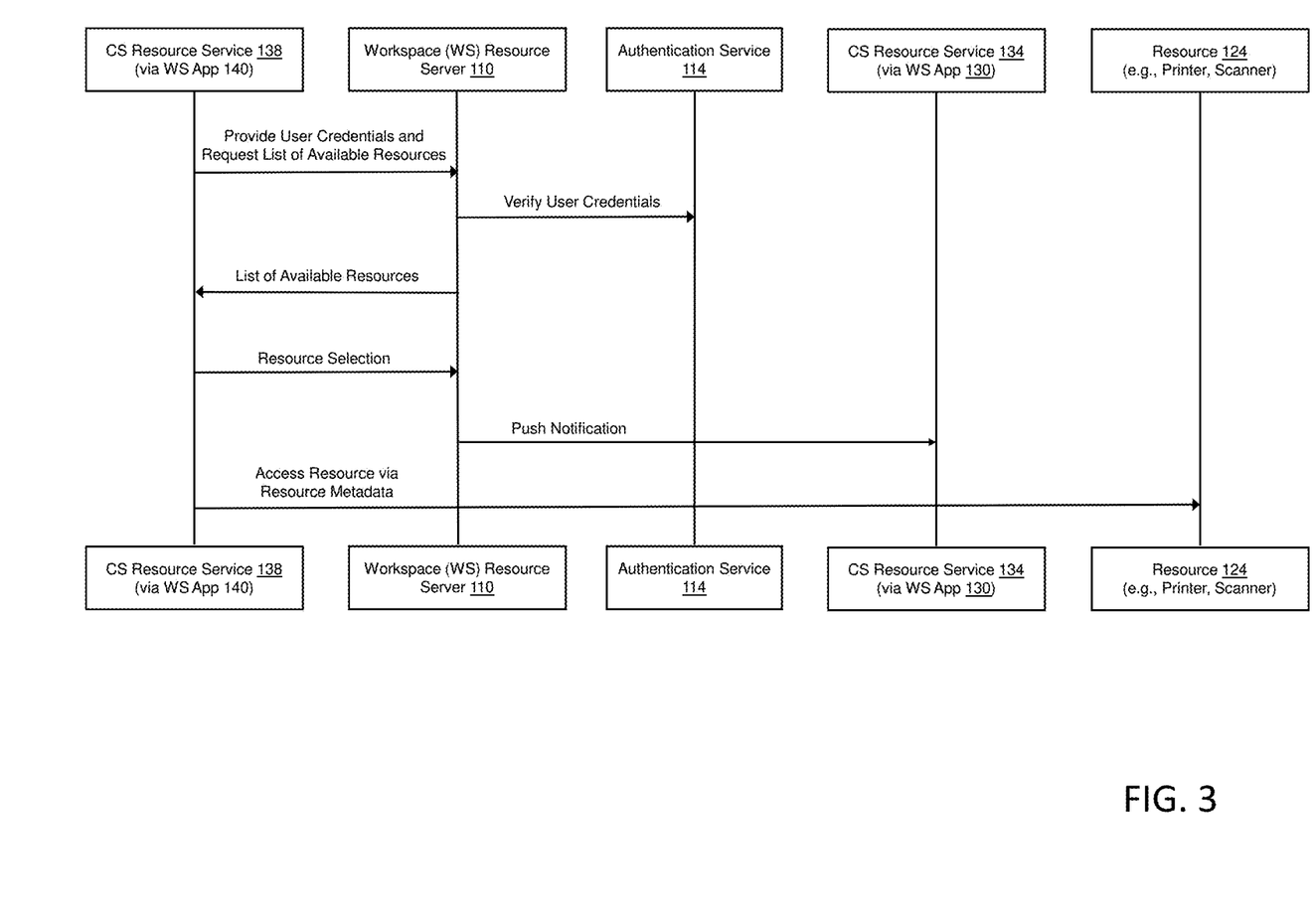
FIG. 3 depicts a diagram for remotely accessing a resource within the virtual computing environment in accordance with an illustrative embodiment.

FIG. 3 depicts an illustrative resource access process, with reference to FIG. 1. In this example, a user of WS application 140 on client device 108 provides user credentials and requests a list of available resources. The CS resource service 138 running on WS application 140 sends a request to the WS resource server 110 via the cloud connector 120. Next, the WS resource server 110 calls the authentication service 114 to verify the credentials of the user. Any authentication process could be used such as an active directory (AD) integration (e.g., a lookup in an AD database), Microsoft Azure AD, integration with any third-party identity provider (IDP), etc. Additionally, using Cloud Connectors, the authorization could be integrated with a local AD account (e.g., if the customer enterprise already supports it).

Once the user is authorized, the WS resource server 110 determines a list of resources available to the user, based on the user's authorization and associated policies. The WS resource server 110 then sends a list of available resources to the user via WS application 140. The user selects a resource 124 they want to access and sends the request to the WS resource server 110. The WS resource server 110 then sends a push notification to the client device 106, to wake up the WS Application 130/VDA session 128 connected to the resource 124. A push notification service 116 may be incorporated into, or be independent, from the WS resource server 110. Once the push notification is received, the user can directly access the resource 124 via the resource metadata information. In an illustrative VDA embodiment, HDX manages any data required by the resource 124, such as print data. In this case, an HDX Printing Virtual Channel is utilized to map the local resource 124 into the session as a virtual printer.

Push notifications from the WS resource server 110 are first sent to a push notification service 116 that is part of the WS resource server 110 or provided by a third party. The notification is then forwarded to the operating system of the client device 106, which forwards the notification to the WS application 130. The notification is then forwarded to the CS resource service 134, which issues a wake up or connect signal to the resource 124.

Note that push notifications are an ideal approach because they leverage efficient native platform capabilities (e.g., Windows, Apple, Android, etc., employ push notifications and respective cloud push notification services). However, existing active connections could alternatively be utilized to send notifications, e.g., active WS application 130 to WS resource server 110 WebSocket connections, or active WS application 130 to VDA HDX connections, e.g. active VDA session 128.

For performance and availability, a client resource 124 may be woken up via a push notification triggered by the WS resource server 110 via the WS application 130 (which maintains a mapping of connected resources on the client device 106). Initially, at the time of resource registration with the WS resource server 110, the WS application 130 may also register with the push notification service 116 and obtain a device token, which is sent along with the resource information to the WS resource server 110. In this embodiment, WS application 130 running on the client device 106 owning the resource 124 does not need to maintain an active resource session 128. In the event another client device requests use of the resource 124, the WS resource server 110 sends the available resource IDs and metadata to the client device 106. After selection of the resource, a request for the same is sent to the WS resource server 110. The WS resource server 110 uses the device token of the client device 106 previously received to send a push notification.

This push notification wakes up the WS application 130 connected to the resource 124. Upon receiving the wake up request, the WS application 130 then activates the resource session 132, and is then able to receive the request to communicate with the resource. If a session already exists (e.g., from a prior request), then that session is utilized. If the session does not exist, then a new headless resource session can be created.

Figure 4:
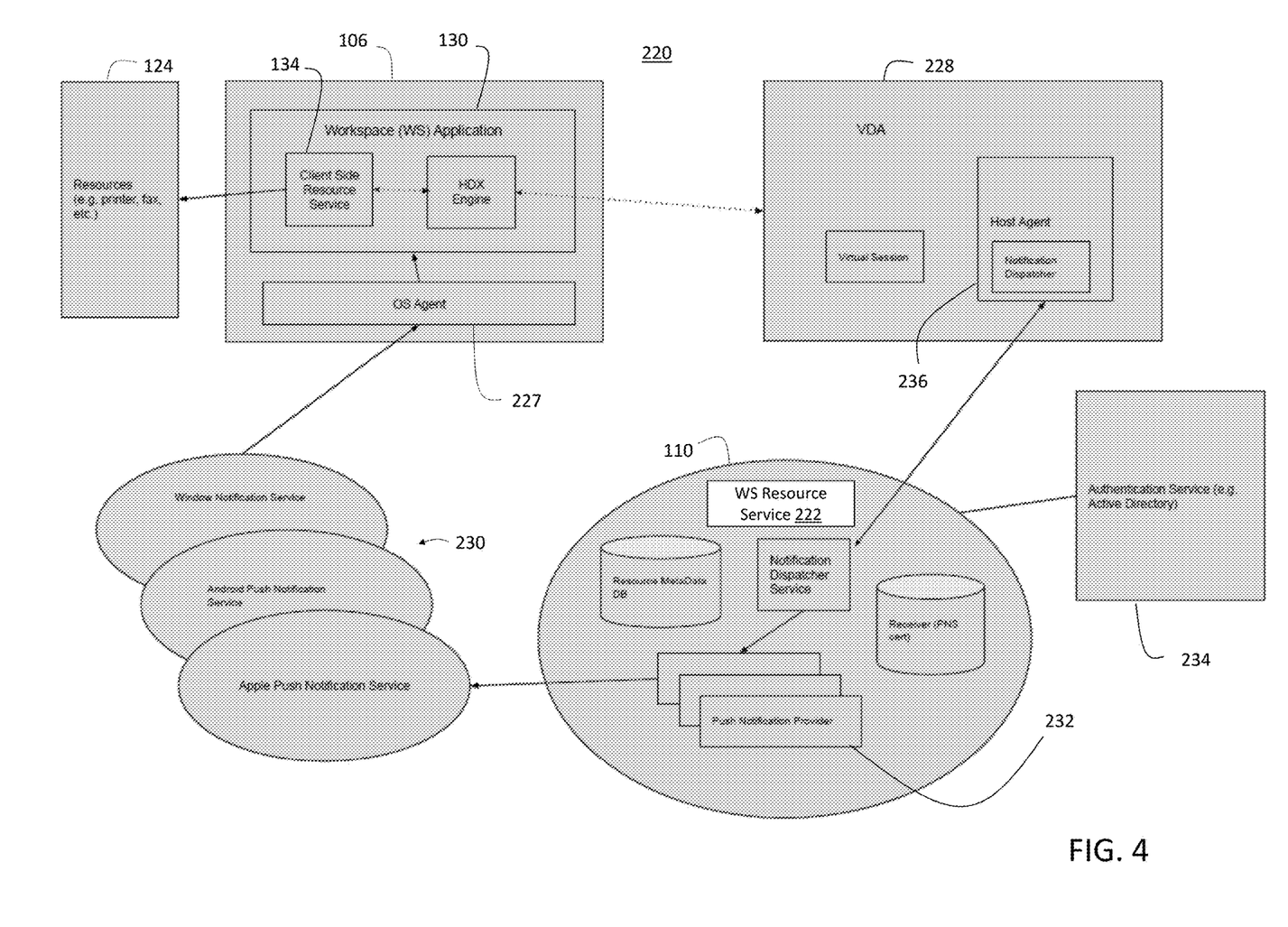
FIG. 4 depicts a resource sharing architecture in accordance with an illustrative embodiment.
Figure 6A:
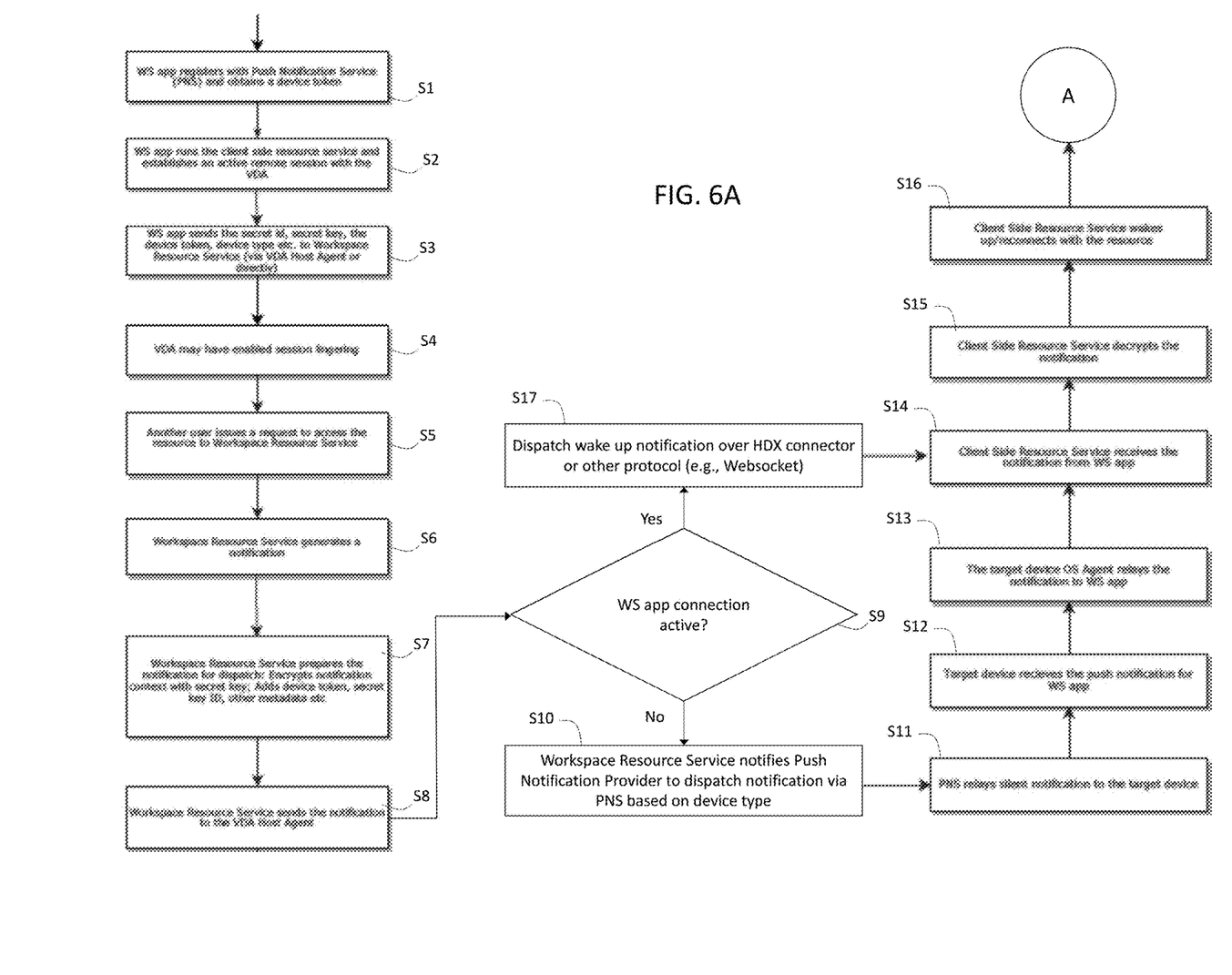
FIGS. 6A and 6B depict a flow diagram of a device sharing and push notification process in accordance with an illustrative embodiment.
Figure 6B:
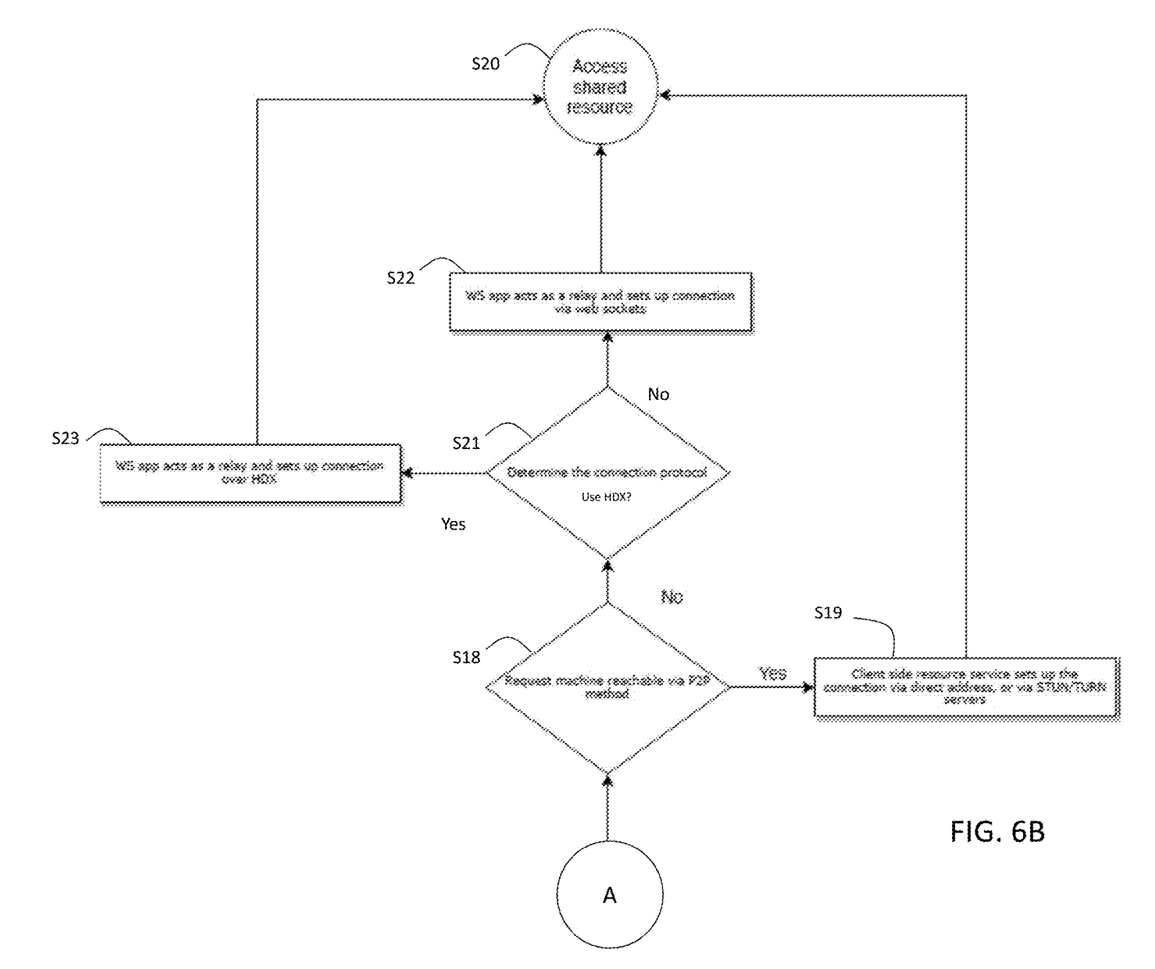

Referring to FIG. 4 and FIGS. 6A and 6B, the use of push notification services in a resource sharing environment 220 is further described. As shown in flow diagram of FIG. 6A (with reference to FIG. 4 and FIG. 1), the WS application 130 registers with a push notification service (PNS) 230 at 51, such as a Window Notification Service, Android PNS, Apple PNS, etc. At S2, the WS application 130 runs the client side resource service 134 and establishes an active remote session with VDA 228. At S3, the WS application 130 sends, e.g., a secret ID, secret key, device token, device type, etc., to WS resource service 222 (e.g., running on WS resource server 110), e.g., via VDA host agent 236 or directly.

At S4, it is noted that VDA 228 may have an enabled session lingering and at S5 another user issues a request to the WS resource service 222 to access the resource 124. At S6, WS resource service 222 generates a notification and at S7 prepares the notification for dispatch, e.g., encrypts the notification context with a secret key and adds a device token, secret key ID, metadata, etc. At S8, the WS service 222 sends the notification to a VDA host agent 236. At S9, a determination is made whether the WS application 130 has an active connection.

If no active connection exists, then the WS resource service 222 notifies the push notification provider 232 to dispatch a notification via PNS based on the device type at S10. Then at S11, the PNS 230 relays a silent notification to the target device (i.e., client device 106 connected to resource 124). At S12, the target device (i.e., client device 106) receives the push notification for WS application 130 and at S13 the target device OS agent 227 relays the notification to the WS application 130. The client side resource service 134 then receives the notification from the WS application 130 at S14 and decrypts the notification at S15. At S16, the client side resource service 134 wakes up/reconnects with the resource 124.

In the event there is an active connection at S9, then a wake up notification is dispatched at S17, e.g., over HDX connector or other protocol such as WebSocket. The process then continues at S14, in which the client side resource service 134 receives the notification from the WS application 130. The process continues below with FIG. 6B.

In an alternative embodiment, rather than using a WS application and virtual channel protocol such as HDX to provide a communication path, a technology such as WebSocket can instead be utilized. WebSocket is a computer communications protocol, providing full-duplex communication channels over a single TCP connection. This approach would remove the need for the CS resource service 134, 138 (FIG. 1) to connect to the VDA or run a headless HDX session. The WebSocket would allow a two-way communication with the WS resource server 110 and sharing of the device metadata. The resource may be awakened via a push notification, as previously described. Alternatively, the resource could be awaked using an existing active WebSocket connection, as previously described. In one implementation, the CS resource service 134, 138 may maintain an open WebSocket and listen to incoming data from the WS resource server 110. In an embodiment where the CS resource service 138 maintains a permanent WebSocket connection, the WS application need not be involved. In an embodiment involving a native platform-integrated push notification, e.g., Apple Push Notification Service (APS), Windows Push Notification Service (WPS), etc., the WS application could be registered to receive the push notifications and relay them to the CS resource service 138.

Figure 5:
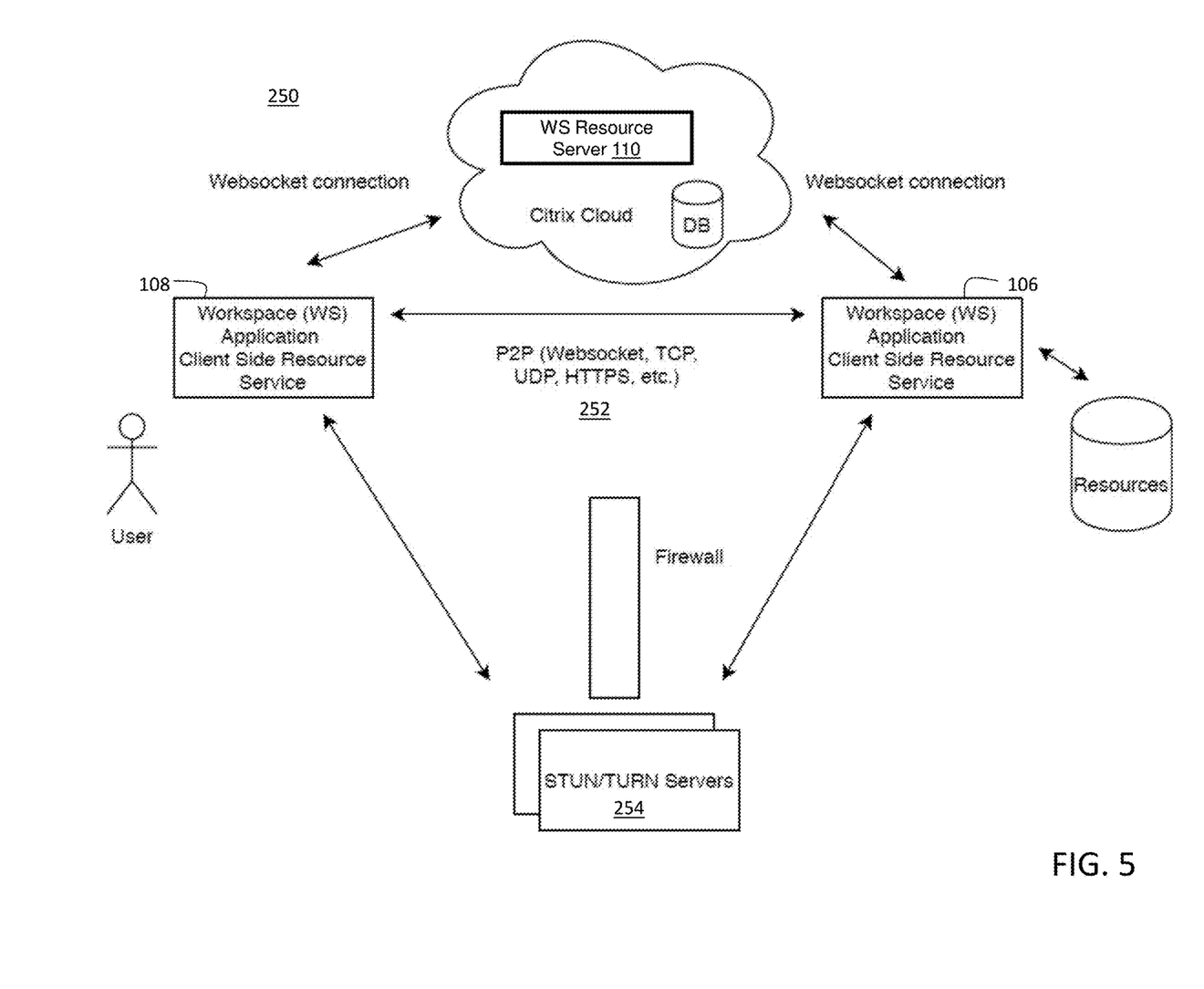
FIG. 5 depicts an alternative resource sharing architecture in accordance with an illustrative embodiment.

FIG. 5 depicts an architecture 250 that does not utilize HDX. Instead, resource sharing via a WS resource server 110 leverages a direct Peer-to-Peer (P2P) connection 252 (e.g., WebSocket, TCP, UDP, HTTPS, etc.) or a P2P indirect connection. As noted, a WebSocket connection can be established with the computing device (e.g., WS resource server 110). P2P direct connections between the first and second devices 106, 108 are utilized whenever possible. Alternatively, a P2P indirect connection, e.g., utilizing help from Session Traversal Utilities for Network Address Translation (STUN)/Traversal Using Relays around Network Address Translation (TURN) servers 254 between the first and second devices may be utilized.

Returning to FIG. 6B, the device sharing process is further described and continues from connector A from FIG. 6A. At S18, a determination is made whether the requested machine (e.g., client device 106 or client device 108) is reachable via a P2P method. If yes, then the client side resource service sets up the connection via a direct address, or via an indirect (e.g., STUN/TURN) server at S19 and access to the shared resource is provided at S20. If the requested machine is not reachable via P2P at S18, then at S21 a determination is made whether to use HDX protocol. If yes, then at S23 the WS application acts as a relay and sets up the connection over HDX and the shared resource is accessed at S20. If not, then at S22 the WS application acts as a relay and sets up a connection via WebSocket and the shared resource is accessed at S20.

Figure 7:
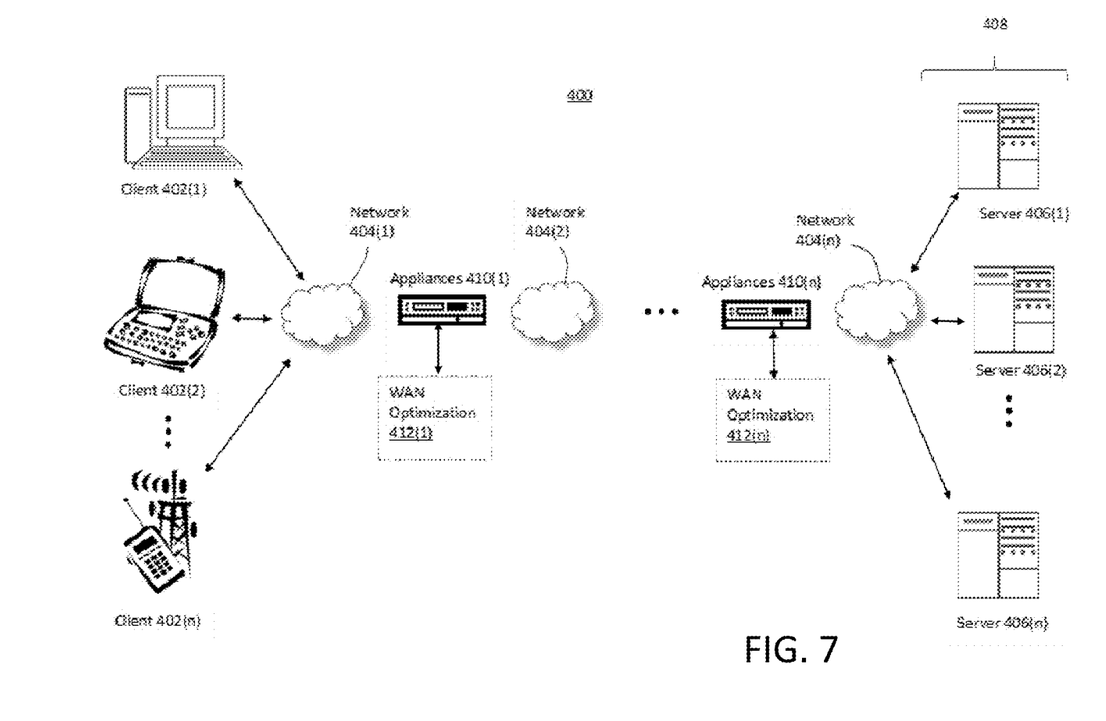
FIG. 7 depicts a network architecture, in accordance with an illustrative embodiment.

Referring to FIG. 7, an illustrative network environment 400 is depicted suitable for implementing an enterprise computing platform. Network environment 400 may include one or more clients 402(1)-402(n) (also generally referred to as local machine(s) 402 or client(s) 402) in communication with one or more servers 406(1)-406(n) (also generally referred to as remote machine(s) 406 or server(s) 406) via one or more networks 404(1)-404n (generally referred to as network(s) 404). In some embodiments, a client 402 may communicate with a server 406 via one or more appliances 410(1)-410n (generally referred to as appliance(s) 410 or gateway(s) 410).

Although the embodiment shown in FIG. 7 shows one or more networks 404 between clients 402 and servers 406, in other embodiments, clients 402 and servers 406 may be on the same network 404. The various networks 404 may be the same type of network or different types of networks. For example, in some embodiments, network 404(1) may be a private network such as a local area network (LAN) or a company Intranet, while network 404(2) and/or network 404(n) may be a public network, such as a wide area network (WAN) or the Internet. In other embodiments, both network 404(1) and network 404(n) may be private networks. Networks 404 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 7, one or more appliances 410 may be located at various points or in various communication paths of network environment 400. For example, appliance 410(1) may be deployed between two networks 404(1) and 404(2), and appliances 410 may communicate with one another to work in conjunction to, for example, accelerate network traffic between clients 402 and servers 406. In other embodiments, the appliance 410 may be located on a network 404. For example, appliance 410 may be implemented as part of one of clients 402 and/or servers 406. In an embodiment, appliance 410 may be implemented as a network device such as Citrix networking (formerly NetScaler®) products sold by Citrix Systems, Inc. of Fort Lauderdale, Fla.

As shown in FIG. 7, one or more servers 406 may operate as a server farm 408. Servers 406 of server farm 408 may be logically grouped, and may either be geographically co-located (e.g., on premises) or geographically dispersed (e.g., cloud based) from clients 402 and/or other servers 406. In an embodiment, server farm 408 executes one or more applications on behalf of one or more of clients 402 (e.g., as an application server), although other uses are possible, such as a file server, gateway server, proxy server, or other similar server uses. Clients 402 may seek access to hosted applications on servers 406.

As shown in FIG. 7, in some embodiments, appliances 410 may include, be replaced by, or be in communication with, one or more additional appliances, such as WAN optimization appliances 412(1)-412(n), referred to generally as WAN optimization appliance(s) 412. For example, WAN optimization appliance 412 may accelerate, cache, compress or otherwise optimize or improve performance, operation, flow control, or quality of feature of network traffic, such as traffic to and/or from a WAN connection, such as optimizing Wide Area File Features (WAFS), accelerating Server Message Block (SMB) or Common Internet File System (CIFS). In some embodiments, appliance(s) 412 may be a performance enhancing proxy or a WAN optimization controller. In one embodiment, appliance 412 may be implemented as Citrix SD-WAN products sold by Citrix Systems, Inc. of Fort Lauderdale, Fla.

In described embodiments, clients 402, servers 406, and appliances 410 and 412 may be deployed as and/or executed on any type and form of computing device, such as any desktop computer, laptop computer, or mobile device capable of communication over at least one network and performing the operations described herein. For example, clients 402, servers 406 and/or appliances 410 and 412 may each correspond to one computer, a plurality of computers, or a network of distributed computers such as computing system 300 shown in FIG. 9.

Figure 8:
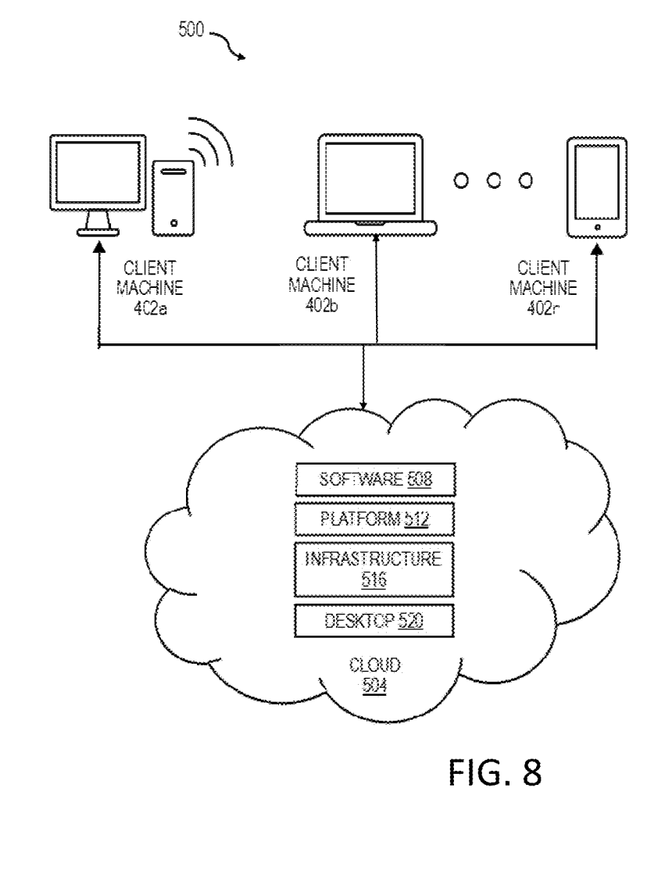
FIG. 8 depicts a cloud system, in accordance with an illustrative embodiment.

Referring to FIG. 8, a cloud computing environment 500 is depicted, which may also be referred to as a cloud environment, cloud computing or cloud network. The cloud computing environment 500 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 500, one or more clients 402a-402n (such as those described above) are in communication with a cloud network 504. The cloud network 504 may include back-end platforms, e.g., servers, storage, server farms or data centers. The users or clients 402a-402n can correspond to a single organization/tenant or multiple organizations/tenants. More particularly, in one example implementation the cloud computing environment 500 may provide a private cloud serving a single organization (e.g., enterprise cloud). In another example, the cloud computing environment 500 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 500 may provide a hybrid cloud that is a combination of a public cloud and a private cloud. Public clouds may include public servers that are maintained by third parties to the clients 402a-402n or the enterprise/tenant. The servers may be located off-site in remote geographical locations or otherwise.

The cloud computing environment 500 can provide resource pooling to serve multiple users via clients 402a-402n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 500 can provide on-demand self-service to unilaterally provision computing capabilities (e.g., server time, network storage) across a network for multiple clients 402a-402n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 500 can provide an elasticity to dynamically scale out or scale in response to different demands from one or more clients 402. In some embodiments, the cloud computing environment 500 can include or provide monitoring services to monitor, control and/or generate reports corresponding to the provided shared services and resources.

In some embodiments, the cloud computing environment 500 may provide cloud-based delivery of different types of cloud computing services, such as Software as a service (SaaS) 508, Platform as a Service (PaaS) 512, Infrastructure as a Service (IaaS) 516, and Desktop as a Service (DaaS) 520, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 9:
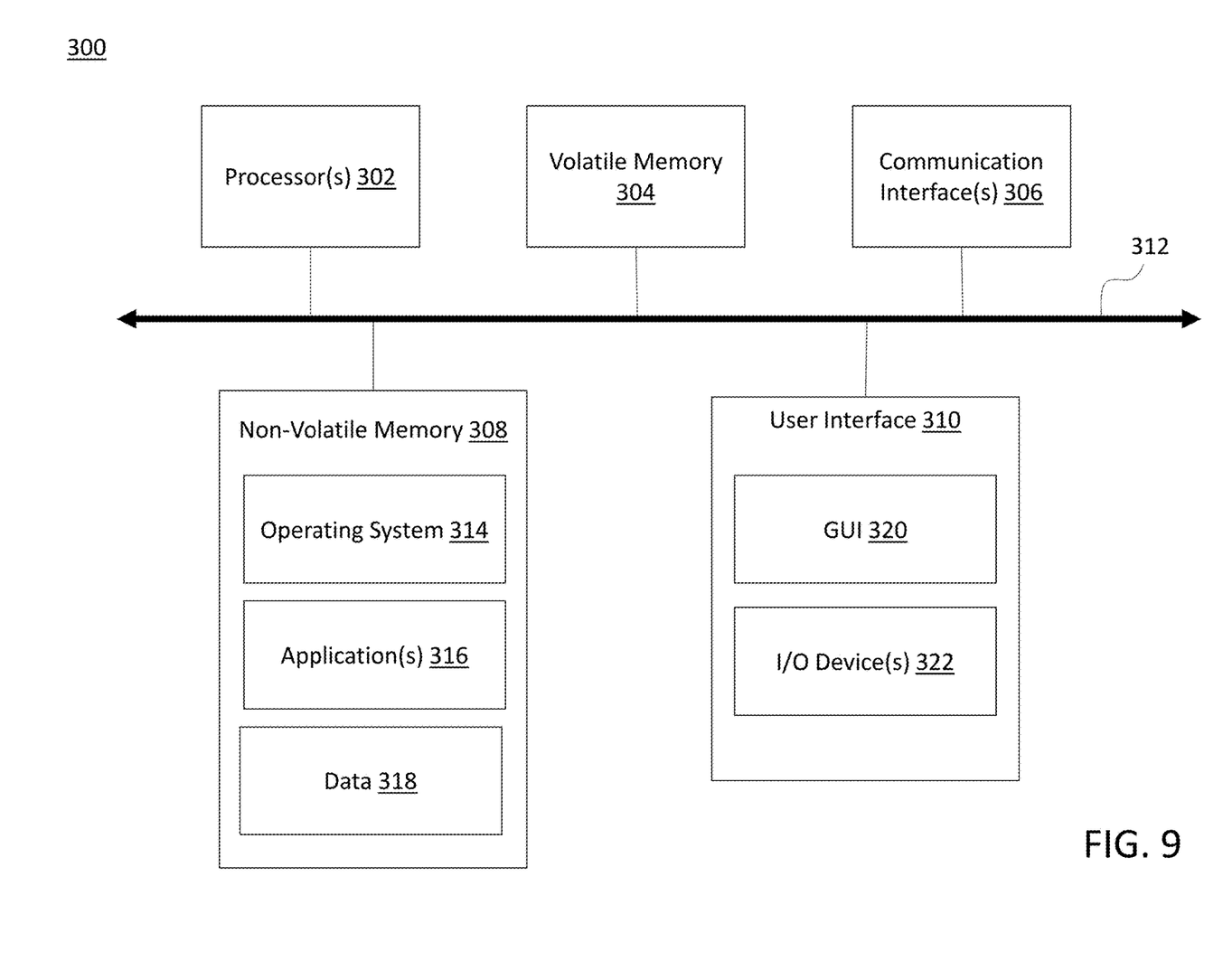
FIG. 9 depicts a computing system, in accordance with an illustrative embodiment.

Elements of the described solution may be embodied in a computing system, such as that shown in FIG. 9 in which a computer 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312.

Computer 300 as shown in FIG. 9 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
   receiving, by a computing device, a request from a first client device, the request being for a list of available resources, wherein the list of available resources includes resources that are locally connected to at least one other client device and that are unavailable to the first client device via an enterprise service within a virtual computing environment;
   providing, by the computing device, the list of available resources to the first client device, the list of available resources including an identifier (ID) and metadata for at least one of the available resources;

receiving, by the computing device, a selection from the first client device of a selected resource included within the list of available resources that is connected to a second client device; and providing, by the computing device, a push notification to the second client device to enable the selected resource to connect with the first computing device.

2. The method according to claim 1, further comprising:
establishing, in response to the push notification, a virtual delivery desktop agent (VDA) session with the selected resource via a workspace application running a client side resource service on the second client device; and
providing, via the computing device, the first client device with access to the selected resource via the VDA session.

3. The method according to claim 1, further comprising:
establishing, in response to the push notification, a virtual desktop agent (VDA) session that operates as a background operation on the second client device; and
providing, via the computing device, the first client device with access to the selected resource via the VDA session.

4. The method according to claim 1, wherein the first client device is connected to the computing device by a VDA session.

5. The method according to claim 1, further comprising:
establishing, in response to the notification, at least one of a WebSocket connection and a peer-to-peer (P2P) connection between the computing device and the second client device connected to the selected resource; and
providing, to the first client device, access to the selected resource via the WebSocket connection or P2P connection.

6. The method according to claim 1, wherein the request for the list of available resources further includes authentication information of a user of the first client device, the method further comprising authenticating the user of the first client device based on the authentication information.

7. The method according to claim 6, wherein the computing device determines access rights to the set of resources for a set of users.

8. The method according to claim 7, further comprising providing, by the computing device to the first client device, the list of available resources based on the authentication of the user of the first client device and the access rights to the set of resources.

9. The method according to claim 1, further comprising:
detecting a new local connection of a resource to a client device;
registering a newly connected resource with a resource database; and
adding the newly connected resource to the list of resources that are available to the first client device.

10. The method according to claim 1, further comprising:
detecting a disconnection of a specified resource from a client device;
notifying the computing device of the disconnection; and
deactivating the specified resource from the list of available resources.

11. A computing device, comprising:
a memory; and
a processor coupled to the memory and being configured for:
storing information associated with a set of resources, the information including an identifier (ID) and metadata for each resource in the set of resources, wherein each resource is connected locally to a client device and each resource is unavailable to other client devices via an enterprise service within a virtual computing environment;
receiving from a first client device a request for a list of available resources;
providing the list of available resources to the first client device, the list of available resources including the ID and metadata for each of the available resources;
receiving from the first client device a selected resource from the list of available resources, wherein the selected resource is connected to a second client device;
pushing a notification to the second client device to enable the selected resource to connect with the first computing device.

12. The computing device according to claim 11, further comprising:
establishing, in response to the notification, a virtual desktop agent (VDA) session with the selected resource via a workspace application running a client side resource service on the second client device; and
providing the first client device with access to the selected resource via the VDA session.

13. The computing device according to claim 11, further comprising:
establishing, in response to the push notification, a virtual desktop agent (VDA) session with the selected resource that operates as a background operation on the second client device; and
providing the first client device with access to the selected resource via the VDA session.

14. The computing device according to claim 11, wherein the first client device is connected to the workspace resource server by a VDA session.

15. The computing device according to claim 11, further comprising:
establishing, in response to the notification, at least one of a WebSocket connection and a peer-to-peer (P2P) connection between the workspace resource server and the second client device connected to the selected resource; and
accessing, by the first client device, the selected resource via the WebSocket connection or the P2P connection.

16. The computing device according to claim 11, further comprising:
authenticating the user of the first client device based on authentication information included with the request for available resources from the first client device.

17. The computing device according to claim 16, further comprising: determining access rights to the set of resources for a set of users.

18. The computing device according to claim 17, further comprising providing to the first client device the list of available resources based on the authentication of the user of the first client device and the access rights to the set of resources.

19. The computing device according to claim 11, further comprising:
detecting a new connection of a resource to a client device;
registering a newly connected resource in a resource database; and
adding the newly connected resource to the list of resources that are available to the first client device.

20. The computing device according to claim 11, further comprising:

detecting a disconnection of a specified resource from a client device;

notifying the workspace resource server of the disconnection; and deactivating the specified resource from the list of available resources.

* * * * *